(12) United States Patent
Onaka

(10) Patent No.: US 7,200,338 B2
(45) Date of Patent: *Apr. 3, 2007

(54) METHOD AND SYSTEM FOR COMMUNICATING A CLOCK SIGNAL OVER AN OPTICAL LINK

(75) Inventor: Hiroshi Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/121,446

(22) Filed: May 4, 2005

(65) Prior Publication Data

US 2005/0207760 A1 Sep. 22, 2005

Related U.S. Application Data

(63) Continuation of application No. 09/853,319, filed on May 10, 2001, now Pat. No. 6,941,078.

(51) Int. Cl.
*H04B 10/00* (2006.01)
*H04B 10/04* (2006.01)

(52) U.S. Cl. ...................... 398/155; 398/185

(58) Field of Classification Search ............... 398/155, 398/154, 185, 188, 186, 187
See application file for complete search history.

(56) References Cited

U.S. PATENT DOCUMENTS

| | | | |
|---|---|---|---|
| 4,794,351 A | 12/1988 | Darcie | 332/7.51 |
| 5,351,148 A | 9/1994 | Maeda et al. | 359/124 |
| 5,355,243 A | 10/1994 | King | 398/203 |
| 5,483,368 A | 1/1996 | Ohshima | 398/79 |
| 5,515,196 A | 5/1996 | Kitajima et al. | 359/180 |
| 5,546,480 A | 8/1996 | Leonard | 385/3 |
| 5,610,911 A * | 3/1997 | Ishikawa et al. | 370/503 |
| 5,633,741 A | 5/1997 | Giles | 359/124 |
| 5,644,664 A | 7/1997 | Burns et al. | 385/2 |
| 5,657,154 A | 8/1997 | Yoneyama | 359/341 |
| 5,778,014 A | 7/1998 | Islam | 372/6 |
| 5,801,862 A | 9/1998 | Desurvire et al. | 398/155 |

(Continued)

FOREIGN PATENT DOCUMENTS

EP 0 381 341 A2 8/1990

(Continued)

OTHER PUBLICATIONS

T. Ito, et al., 6.4 Tb/s (160×40 Gb/s) WDM Transmission Experiment with 0.8 bit/s/Hz Spectral Efficiency, Technical Digest of European Conference on Optical Communications 2000 (ECOC 2000), postdeadline paper 1.1 (Munich), Sep. 2000.

(Continued)

*Primary Examiner*—Shi K. Li
(74) *Attorney, Agent, or Firm*—Baker Botts L.L.P.

(57) ABSTRACT

A method and system for communicating a clock signal over an optical link includes receiving a multimodulated optical information signal including non-intensity modulation for a data signal and intensity modulation for a clock signal. The clock signal is recovered based on the intensity modulation of the multimodulated optical information signal. The non-intensity modulation for the data signal is converted to intensity modulation for the data signal. The data signal is recovered from the intensity modulation for the data signal using the clock signal.

19 Claims, 7 Drawing Sheets

U.S. PATENT DOCUMENTS

| | | | | |
|---|---|---|---|---|
| 5,864,625 A * | 1/1999 | Rutledge | ................... | 380/31 |
| 5,896,211 A | 4/1999 | Watanabe | ................... | 359/124 |
| 5,898,517 A | 4/1999 | Weis | ................... | 356/5.09 |
| 5,907,421 A | 5/1999 | Warren et al. | ................... | 359/180 |
| 5,912,755 A | 6/1999 | Bergano | ................... | 398/185 |
| 5,946,119 A | 8/1999 | Bergano et al. | ................... | 359/124 |
| 5,986,782 A | 11/1999 | Alexander et al. | ................... | 359/110 |
| 6,005,702 A | 12/1999 | Suzuki et al. | ................... | 359/183 |
| 6,021,233 A | 2/2000 | Koehler | ................... | 385/24 |
| 6,049,706 A | 4/2000 | Cook et al. | ................... | 455/313 |
| 6,057,950 A | 5/2000 | Bergano | ................... | 359/181 |
| 6,058,147 A | 5/2000 | Eklof et al. | ................... | 375/344 |
| 6,078,416 A | 6/2000 | Yano | ................... | 398/154 |
| 6,108,125 A | 8/2000 | Yano | ................... | 398/154 |
| 6,118,397 A | 9/2000 | Heflinger | ................... | 341/137 |
| 6,147,796 A | 11/2000 | Ma et al. | ................... | 359/341 |
| 6,163,394 A | 12/2000 | Webb | ................... | 359/181 |
| 6,163,636 A | 12/2000 | Stentz et al. | ................... | 385/24 |
| 6,178,036 B1 | 1/2001 | Yao | ................... | 359/334 |
| 6,178,208 B1 | 1/2001 | Gershon | ................... | 375/322 |
| 6,181,464 B1 | 1/2001 | Kidorf et al. | ................... | 359/334 |
| 6,323,993 B1 | 11/2001 | Hansen et al. | ................... | 359/337 |
| 6,341,023 B1 | 1/2002 | Puc | ................... | 359/124 |
| 6,407,845 B2 | 6/2002 | Nakamoto | ................... | 359/239 |
| 6,417,958 B1 | 7/2002 | Du et al. | ................... | 359/334 |
| 6,459,515 B1 | 10/2002 | Bergano | ................... | 359/124 |
| 6,473,214 B1 | 10/2002 | Roberts et al. | ................... | 398/183 |
| 6,512,621 B1 * | 1/2003 | Fuse et al. | ................... | 398/187 |
| 6,535,328 B2 * | 3/2003 | Yao | ................... | 359/334 |
| 6,549,311 B1 | 4/2003 | Hakki et al. | ................... | 359/124 |
| 6,556,326 B2 | 4/2003 | Bergano | ................... | 359/181 |
| 6,556,327 B1 * | 4/2003 | Ohya et al. | ................... | 398/198 |
| 6,559,996 B1 | 5/2003 | Miyamoto et al. | ................... | 398/183 |
| 6,606,178 B1 | 8/2003 | Rhee et al. | ................... | 398/188 |
| 6,616,353 B1 | 9/2003 | Helkey | ................... | 398/183 |
| 6,618,352 B1 | 9/2003 | Shirakata et al. | ................... | 370/203 |

FOREIGN PATENT DOCUMENTS

| | | |
|---|---|---|
| EP | 0 421 675 A2 | 4/1991 |
| EP | 0 714 187 A2 | 5/1996 |
| EP | 0 903 876 A1 | 3/1999 |
| EP | 1 018 666 A1 | 7/2000 |
| EP | 1 056 228 A2 | 11/2000 |
| EP | 1 102 114 A1 | 5/2001 |
| JP | 08-288916 | 1/1996 |
| JP | 11-004196 * | 1/1999 |
| JP | 11-004196 | 6/1999 |
| JP | 02000059300 A | 2/2000 |
| WO | WO 01/08422 A2 | 2/2001 |
| WO | WO 01/22627 A1 | 3/2001 |

OTHER PUBLICATIONS

S. Bigo, et al., "5.12 Tb/s (128×40 Gbit/s WDM) Transmission over 3×100 km OF TeraLight™ Fibre," Technical Digest of European Conference on Optical Communications 2000 (ECOC 2000), postdeadline paper 1.2 (Munich), Sep. 2000.

A. Färbert, et al., 7 Tb/s (176×40 Gb/s) BiDirectional Interleaved Transmission with 50 GHz Channel Spacing, Technical Digest of European Conference on Optical Communications 2000 (ECOC 2000), postdeadline paper 1.2 (Munich), Sep. 2000.

N. Edagaw et al. "Fiber Raman Amplifiers," Laser Kenkyu, XX, JP, vol. 17, No. 9, 1989, pp. 616-627, XP002946507, 12 pages.

M. Tomizawa et al. "Automatic Dispersion Equalization for Installing High-Speed Optical Transmission Systems" Journal of Lightwave Technology, IEEE, New York, vol. 16, No. 2, Feb. 1, 1989, pp. 184-191, XP000750656, 8 pages.

E. Brun-Maunand et al. "Recent Progress on Soliton Systems," 22nd European Conference on Optical Communication—ECOC 1996, Oslo, pp. 3.93-3.100, XP010303122, 8 pages.

Y. Yamabayashi et al. "Single-Wavelength Dispersion Measurement for Multiple-Fiber Section Connected with Narrow-Band Optical Amplifiers" IEEE Transactions on Instrumentation and Measurement, IEEE, Inc. New York, vol. 45, No. 1, Feb. 1996, pp. 218-224, XP000557132, 7 pages.

O. Vassilieva et al. "Numerical comparison of NRZ, CS-RZ and IM-DPSK formals in 43Gbit/s WDM transmission," 14th Annual Meeting of the IEEE Lasers and Electro-Optics Society, Leos 2001, San Diego, CA, dated Nov. 12-13, 2001, XP001085363, 2 pages.

Walid A. Atia et al., "Demonstration of Return-to-Zero Signaling in both OOK and DPSK Formats to Improve Receiver Sensitivity in an Optically Preamplified Receiver," Lasers and Electro-Optics Society 1999 12th Annual Meeting, LEOS 1999, IEEE, vol. 1, 8-11, pp. 226-227, vol. 1, 2 pages.

Takato, et al., *"Silica-Based Integrated Optic Mach-Zehnder Multi/Demultiplexer Family with Channel Spacing of 0.01-250 nm"*, IEEE Journal on Selected Areas in Communications, vol. 8, No. 6, pp. 1120-1127, Aug. 1990.

T. Miyano, et al., "Suppression of Degradation Induced by SPM/XPM+GVD in WDM transmission using a bit-synchronous intensity modulated DPSK signal," Fifth Optoelectronics and Communications Conference (OECC 2000) Technical Digest (Related article by same authors entitled "WDM transmission using bit-synchronous intensity modulated DPSK signals," at proceedings of the 2000 IEICE general conference, B-10-135, p. 510, Mar. 2000 (in Japanese)).

"Wavelength Division Multiplexing (WDM)," http://wwwlightreading.com/document.asp, Printed May 9, 2001.

"Nonlinear Effects," http://wwwlightreading.com/document.asp, Printed May 9, 2001.

"Optical Amplification," http://wwwlightreading.com/document.asp, Printed May 9, 2001.

"Erbium Doped-Fiber Amplifiers (EDFAs)," http://wwwlightreading.com/document.asp, Printed May 9, 2001.

"Raman Amplification," http://wwwlightreading.com/document.asp, Printed May 9, 2001.

S. Chinn, et al., "Sensitivity of Optically Preamplified DPSK Receivers with Fabry-Perot Filters," Journal of Lightwave Technology, vol. 14, No. 3, pp. 370-376, Mar. 1996.

G. Jacobsen, *Noise in Digital Optical Transmission Systems*, Artech House (Boston), p. 25, Jul. 1994.

English translation of an Official Action of Japanese Patent Office for Japanese Application No. 2002-588003.

* cited by examiner

METHOD AND SYSTEM FOR COMMUNICATING A CLOCK SIGNAL OVER AN OPTICAL LINK

RELATED PATENT APPLICATIONS

This application is a continuation of U.S. application Ser. No. 09/853,319, filed May 10, 2001, now U.S. Pat. No. 6,941,078, by Hiroshi Onaka and entitled "Method and System for Communicating a Clock Signal Over an Optical Link".

This application is related to U.S. patent application Ser. No. 09/853,323 entitled "Method and System for Transmitting Information in an Optical Communication System Using Distributed Amplification," U.S. patent application Ser. No. 09/853,318 entitled "Receiver and Method for a Multichannel Optical Communication System," U.S. patent application Ser. No. 09/853,316 entitled "Method and System for Demultiplexing Non-Intensity Modulated Wavelength Division Multiplexed (WDM) Signals," and U.S. patent application Ser. No. 09/853,340 entitled "Method and System for Tuning an Optical Signal Based on Transmission Conditions," all filed on May 10, 2001.

TECHNICAL FIELD OF THE INVENTION

The present invention relates generally to optical communication systems, and more particularly to a method and system for communicating a clock signal over a optical link.

BACKGROUND OF THE INVENTION

Telecommunications systems, cable television systems and data communication networks use optical networks to rapidly convey large amounts of information between remote points. In an optical network, information is conveyed in the form of optical signals through optical fibers. Optical fibers are thin strands of glass capable of transmitting the signals over long distances with very low loss.

Optical networks often employ wavelength division multiplexing (WDM) to increase transmission capacity. In a WDM network, a number of optical channels are carried in each fiber at disparate wavelengths. Network capacity is increased as a multiple of the number of wavelengths, or channels, in each fiber.

Each optical channel carries a data signal and a corresponding clock signal. The clock signal is recovered and used to make forward error corrections (FEC) decisions for the data signal. FEC typically requires good clock extraction which is difficult with very poor waveforms and/or a large amount of jitter present in conventional intensity shift keying systems. To improve clock recovery, a pure clock signal has been transmitted to each node as a data signal. This however is not cost-effective and is complicated from a network operation standpoint.

SUMMARY OF THE INVENTION

The present invention provides a method and system for communicating a clock signal over an optical link that substantially reduces or eliminated problems and disadvantages associated with previous systems and methods. In a particular embodiment, the clock signal is modulated onto a intensity or other suitable characteristic of a data channel and extracted from that characteristic by a receiver.

In accordance with one embodiment of the present invention, a method and system for communicating a clock signal over an optical link includes receiving a multimodulated optical information signal including non-intensity modulation for a data signal and intensity modulation for a clock signal. The clock signal is recovered based on the intensity modulation of the multimodulated optical information signal. The non-intensity modulation for the data signal is converted to intensity modulation for the data signal. The data signal is recovered from the intensity modulation for the data signal using the clock signal.

More specifically, in accordance with a particular embodiment of the present invention, the data signal may be phase shift keyed in the multimodulated optical information signal. In this embodiment, the clock signal may be intensity shift keyed in the multimodulated optical information signal. The clock signal may be used for forward error correction (FEC) in addition to data signal recovery.

Technical advantages of the present invention include providing an improved method and system for communicating a clock signal over an optical link. In a particular embodiment, the clock signal is modulated onto the intensity or other suitable characteristic of a data channel and from there extracted by a receiver. Accordingly, stability of clock recovery is improved even in the presence of poor optical signal quality and jitter. As a result, for error correction (FEC) is enhanced to lower bit error rates at the receiver.

Other technical advantages of the present invention will be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
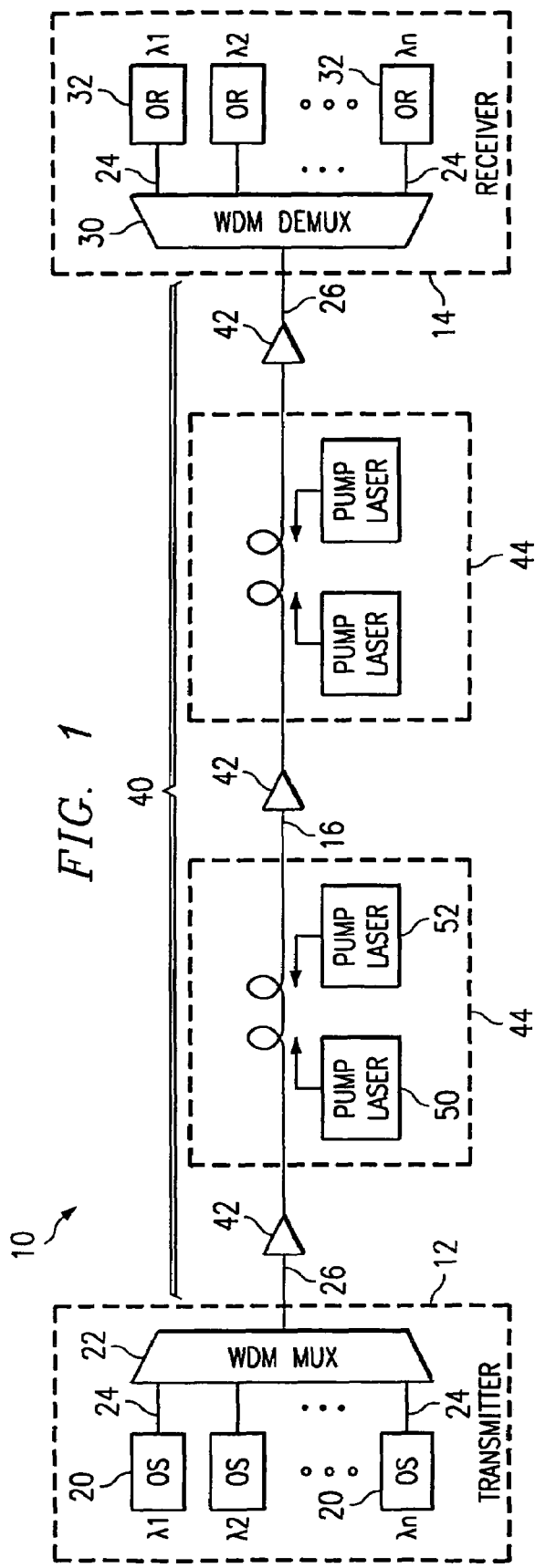
FIG. 1 is a block diagram illustrating an optical communication system using distributed amplification in accordance with one embodiment of the present invention.

FIG. 1 illustrates an optical communication system 10 in accordance with one embodiment of the present invention. In this embodiment, the optical communication system 10 is a wavelength division multiplexed (WDM) system in which a number of optical channels are carried over a common path at disparate wavelengths. It will be understood that the optical communication system 10 may comprise other suitable single channel, multichannel or bi-directional transmission systems.

Referring to FIG. 1, the WDM system 10 includes a WDM transmitter 12 at a source end point and a WDM receiver 14 at a destination end point coupled together by an optical link 16. The WDM transmitter 12 transmits data in a plurality of optical signals, or channels, over the optical link 16 to the remotely located WDM receiver 14. Spacing between the channels is selected to avoid or minimize cross talk between adjacent channels. In one embodiment, as described in more detail below, minimum channel spacing (df) comprises a multiple of the transmission symbol and/or bit rate (B) within 0.4 to 0.6 of an integer (N). Expressed mathematically: $(N+0.4)B < df < (N+0.6)B$. This suppresses neighboring channel cross talk. It will be understood that channel spacing may be suitably varied without departing from the scope of the present invention.

The WDM transmitter 12 includes a plurality of optical senders 20 and a WDM multiplexer 22. Each optical sender 20 generates an optical information signal 24 on one of a set of distinct wavelengths $\lambda_1, \lambda_2 \ldots \lambda_n$ at the channel spacing. The optical information signals 24 comprise optical signals with at least one characteristic modulated to encode audio, video, textual, real-time, non-real-time or other suitable data. The optical information signals 24 are multiplexed into a single WDM signal 26 by the WDM multiplexer 22 for transmission on the optical link 16. It will be understood that the optical information signals 24 may be otherwise suitably combined into the WDM signal 26. The WDM signal is transmitted in the synchronous optical network (SONET) or other suitable format.

The WDM receiver 14 receives, separates and decodes the optical information signals 24 to recover the included data. In one embodiment, the WDM receiver 14 includes a WDM demultiplexer 30 and a plurality of optical receivers 32. The WDM demultiplexer 30 demultiplexes the optical information signals 24 from the single WDM signal 26 and sends each optical information signal 24 to a corresponding optical receiver 32. Each optical receiver 32 optically or electrically recovers the encoded data from the corresponding signal 24. As used herein, the term each means every one of at least a subset of the identified items.

The optical link 16 comprises optical fiber or other suitable medium in which optical signals may be transmitted with low loss. Interposed along the optical link 16 are one or more optical amplifiers 40. The optical amplifiers 40 increase the strength, or boost, one or more of the optical information signals 24, and thus the WDM signal 26, without the need for optical-to-electrical conversion.

In one embodiment, the optical amplifiers 40 comprise discrete amplifiers 42 and distributed amplifiers 44. The discrete amplifiers 42 comprise rare earth doped fiber amplifiers, such as erbium doped fiber amplifiers (EDFAs), and other suitable amplifiers operable to amplify the WDM signal 26 at a point in the optical link 16.

The distributed amplifiers 44 amplify the WDM signal 26 along an extended length of the optical link 16. In one embodiment, the distributed amplifiers 44 comprise bi-directional distributed Raman amplifiers (DRA). Each bi-directional DRA 44 includes a forward, or co-pumping source laser 50 coupled to the optical link 16 at a beginning of the amplifier 44 and a backward, or counter-pumping source laser 52 coupled to the optical link 16 at an end of the amplifier 44. It will be understood that the co-pumping and counter-pumping source lasers 50 and 52 may amplify disparate or only partially overlapping lengths of the optical link 16.

The Raman pump sources 50 and 52 comprise semiconductor or other suitable lasers capable of generating a pump light, or amplification signal, capable of amplifying the WDM signal 26 including one, more or all of the included optical information signals 24. The pump sources 50 and 52 may be depolarized, polarization scrambled or polarization multiplexed to minimize polarization sensitivity of Raman gain.

The amplification signal from the co-pumping laser 52 is launched in the direction of travel of the WDM signal 26 and thus co-propagated with the WDM signal 26 at substantially the same speed and/or a slight or other suitable velocity mismatch. The amplification signal from the counter-pumping laser 52 is launched in a direction of travel opposite that of the WDM signal 26 and thus is counter-propagated with respect to the WDM signal 26. The amplification signals may travel in opposite directions simultaneously at the same or other suitable speed.

The amplification signals comprise one or more high power lights or waves at a lower wavelength than the signal or signals to be amplified. As the amplification signal travels in the optical link 16, it scatters off atoms in the link 16, loses some energy to the atoms and continues with the same wavelength as the amplified signal or signals. In this way, the amplified signal acquires energy over many miles or kilometers in that it is represented by more photons. For the WDM signal 26, the co-pumping and counter-pumping lasers 50 and 52 may each comprise several different pump wavelengths that are used together to amplify each of the wavelength distincts optical information signals 24.

In one embodiment, as described in more detail below, a non-intensity characteristic of a carrier signal is modulated with the data signal at each optical sender 20. The non-intensity characteristic comprises phase, frequency or other suitable characteristic with no or limited susceptibility to cross talk due to cross-gain modulation (XGM) from a forward pumping distributed amplifier or a bi-directional pumping distributed amplifier. The non-intensity modulated optical information signal may be further and/or remodulated with a clock or other non-data signal using an intensity modulator. Thus, the non-intensity modulated optical information signal may comprise intensity modulation of a non-data signal.

In a particular embodiment, as described in more detail below, the WDM signal 26 comprises phase or frequency modulated optical information signals 24 which are amplified using the bi-directional DRAs 44 with no cross talk between the channels 24 due to XGM. In this embodiment, the bi-directional DRAs 44 provide amplification at a superior optical signal-to-noise ratio and thus enable longer transmission distances and improved transmission performance.

Figure 2:
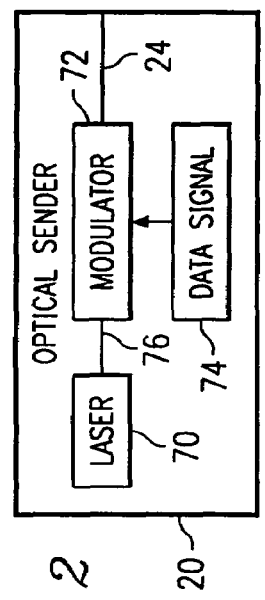
FIG. 2 is a block diagram illustrating the optical sender of FIG. 1 in accordance with one embodiment of the present invention.

FIG. 2 illustrates details of the optical sender 20 in accordance with one embodiment of the present invention. In this embodiment, the optical sender 20 comprises a laser 70, a modulator 72 and a data signal 74. The laser 70 generates a carrier signal at a prescribed frequency with good wavelength control. Typically, the wavelengths emitted by the laser 70 are selected to be within the 1500 nanometer (nm) range, the range at which the minimum signal attenuation occurs for silica-based optical fibers. More particularly, the wavelengths are generally selected to be in the range from 1310 to 1650 nm but may be suitably varied.

The modulator 72 modulates the carrier signal with the data signal 74 to generate the optical information signal 24. The modulator 72 may employ amplitude modulation, frequency modulation, phase modulation, intensity modulation, amplitude-shift keying, frequency-shift keying, phase-shift keying and other suitable techniques for encoding the data signal 74 onto the carrier signal. In addition, it will be understood that different modulators 72 may employ more than one modulation system in combination.

In accordance with one embodiment, modulator 72 modulates the phrase, frequency or other suitable non-intensity characteristic of the carrier signal with the data signal 74. As previously described, this generates a non-intensity optical information signal 24 with poor susceptibility to cross talk due to XGM in long-haul and other transmission systems using bi-directional DRA or other distributed amplification. Details of the carrier wave, frequency modulation of the carrier wave and phase modulation of the carrier wave are illustrated in FIGS. 3A–C.

Figure 3A:
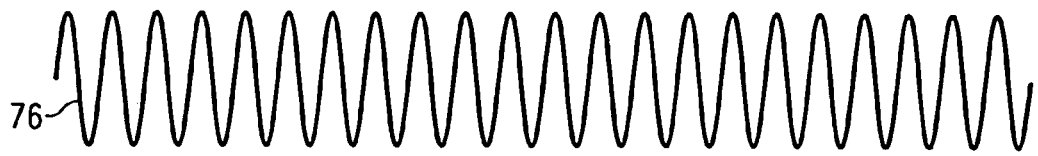
FIGS. 3A–C are diagrams illustrating non-intensity modulated signals for transmission in the optical communication system of FIG. 1 in accordance with several embodiments of the present invention.

Referring to FIG. 3A, the carrier signal 76 is a completely periodic signal at the specified wavelength. The carrier signal 76 has at least one characteristic that may be varied by modulation and is capable of carrying information via modulation.

Figure 3B:
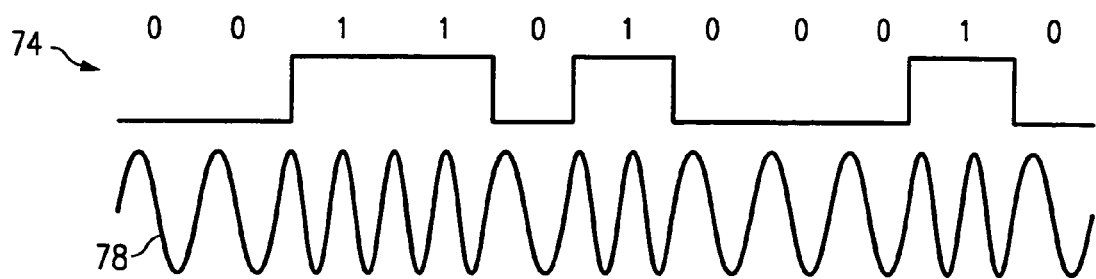

Referring to FIG. 3B, the frequency of the carrier signal 76 is modulated with a data signal 74 to generate a frequency modulated optical information signal 78. In frequency modulation, the frequency of the carrier signal 76 is shifted as a function of the data signal 74. Frequency shift keying may be used in which the frequency of the carrier signal shifts between discrete states.

Figure 3C:
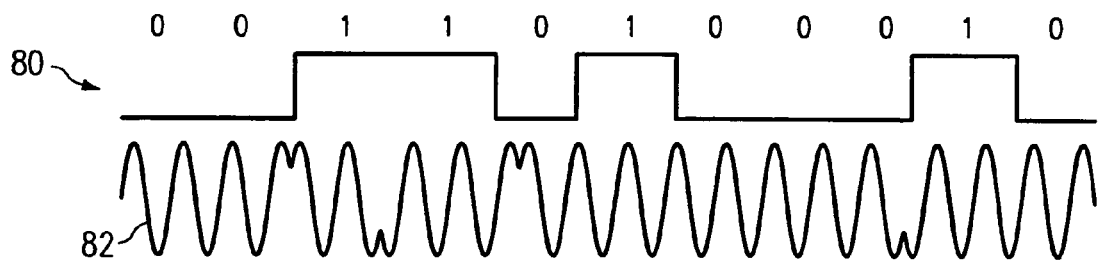

Referring to FIG. 3C, the phase of the carrier signal 76 is modulated with a data signal 80 to generate a phase modulated optical information signal 82. In phase modulation, the phase of the carrier signal 76 is shifted as a function of the data signal 80. Phase shift keying may be used in which the phase of the carrier signal shifts between discrete states.

Figure 4:
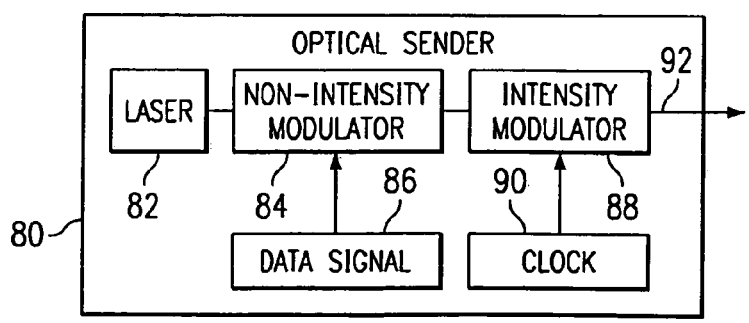
FIG. 4 is a block diagram illustrating the optical sender of FIG. 1 in accordance with another embodiment of the present invention.

FIG. 4 illustrates an optical sender 80 in accordance with another embodiment of the present invention. In this embodiment, data is phase or frequency modulated onto the carrier signal and then remodulated with intensity modulation synchronized with the signal clock to provide superior power tolerance in the transmission system.

Figure 5:
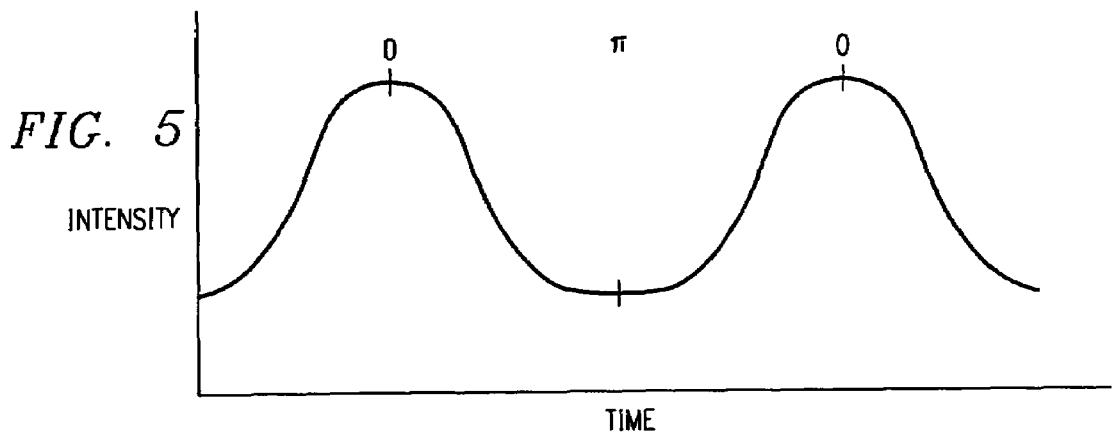
FIG. 5 is a diagram illustrating the optical waveform generated by the optical sender of FIG. 4 in accordance with one embodiment of the present invention.

Referring to FIG. 4, the optical sender 80 includes a laser 82, a non-intensity modulator 84 and data signal 86. The non-intensity modulator 84 modulates the phase or frequency of the carrier signal from the laser 82 with the data signal 86. The resulting data modulated signal is passed to the intensity modulator 88 for remodulation with the clock frequency 90 to generate a dual or otherwise multimodulated optical information signal 92. Because the intensity modulation based on the clock is a non-random, completely periodic pattern, little or no cross talk due to XGM is generated by the DRAs 44 so long as there is a slight velocity mismatch in the forward pumping direction. FIG. 5 illustrates the waveform of the dual modulated optical information signal 92.

Figure 6:
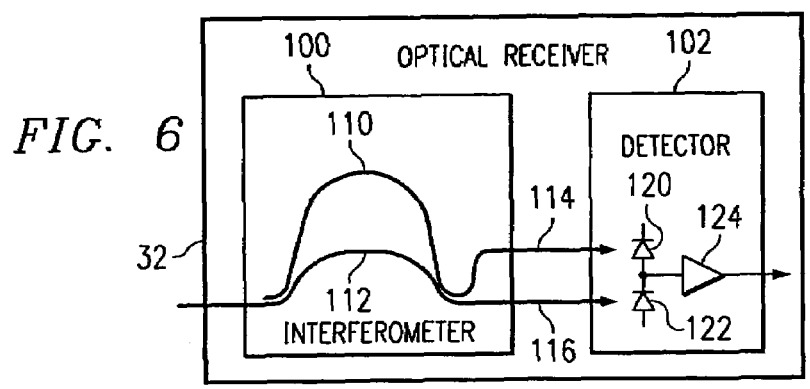
FIG. 6 is a block diagram illustrating the optical receiver of FIG. 1 in accordance with one embodiment of the present invention.

FIG. 6 illustrates details of the optical receiver 32 in accordance with one embodiment of the present invention. In this embodiment, the optical receiver 32 receives a demultiplexed optical information signal 24 with the data modulated on the phase of the carrier signal with phase shift keying. It will be understood that the optical receiver 32 may be otherwise suitably configured to receive and detect data otherwise encoded in an optical information signal 24 without departing from the scope of the present invention.

Referring to FIG. 6, the optical receiver 32 includes an asymmetric interferometer 100 and a detector 102. The interferometer 100 is an asymmetric Mach-Zender or other suitable interferometer operable to convert a non-intensity modulated optical information signal 24 into an intensity modulated optical information signal for detection of data by the detector 102. Preferably, the Mach-Zender interferometer 100 with wavelength dependent loss and good rejection characteristics for the channel spacing.

The Mach-Zender interferometer 100 splits the received optical signal into two interferometer paths 110 and 112 of different lengths and then combines the two paths 110 and 112 interferometrically to generate two complimentary output signals 114 and 116. In particular, the optical path difference (L) is equal to the symbol rate (B) multiplied by the speed of light (c) and divided by the optical index of the paths (n). Expressed mathematically: L=Bc/n.

In a particular embodiment, the two path lengths 110 and 112 are sized based on the symbol, or bit rate to provide a one symbol period, or bit shift. In this embodiment, the Mach-Zender interferometer 100 has a wavelength dependent loss that increases the rejection of neighboring channels when channel spacing comprises the symbol transmission rate multiple within 0.4 to 0.6 of an integer as previously described.

The detector 102 is a dual or other suitable detector. In one embodiment, the dual detector 102 includes photodiodes 120 and 122 connected in series in a balanced configuration and a limiting amplifier 124. In this embodiment, the two complimentary optical outputs 114 and 116 from the Mach-Zender interferometer 100 are applied to the photodiodes 120 and 122 for conversion of the optical signal to an electrical signal. The limiting electronic amplifier 124 converts the electrical signal to a digital signal (0 or 1) depending on the optical intensity delivered by the interferometer 100. In another embodiment, the detector 102 is a single detector with one photodiode 122 coupled to output 116. In this embodiment, output 114 is not utilized.

Figure 7:
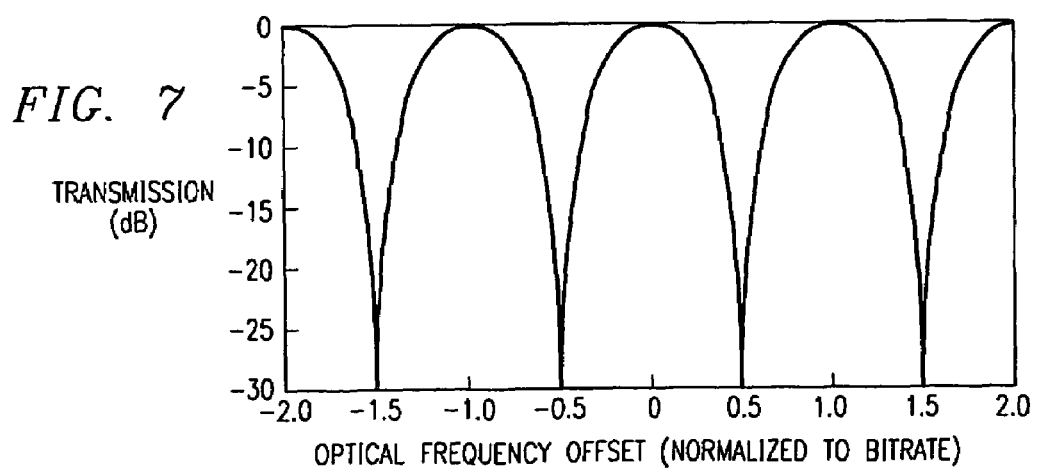
FIG. 7 is a diagram illustrating the frequency response of the asymmetric Mach-Zender interferometer of FIG. 6 in accordance with one embodiment of the present invention.

FIG. 7 illustrates the frequency response of the asymmetric Mach-Zender interferometer 100 in accordance with one embodiment of the present invention. In this embodiment, channel spacing comprises the symbol transmission rate multiple within 0.4 to 0.6 of an integer as previously described. As can be seen, optical frequency of neighboring channels is automatically rejected by the asymmetric Mach-Zender interferometer 100 to aid channel rejection of the demultiplexer 30. It will be understood that the asymmetric Mach-Zender interferometer may be used in connection with other suitable channel spacings.

Figure 8A:
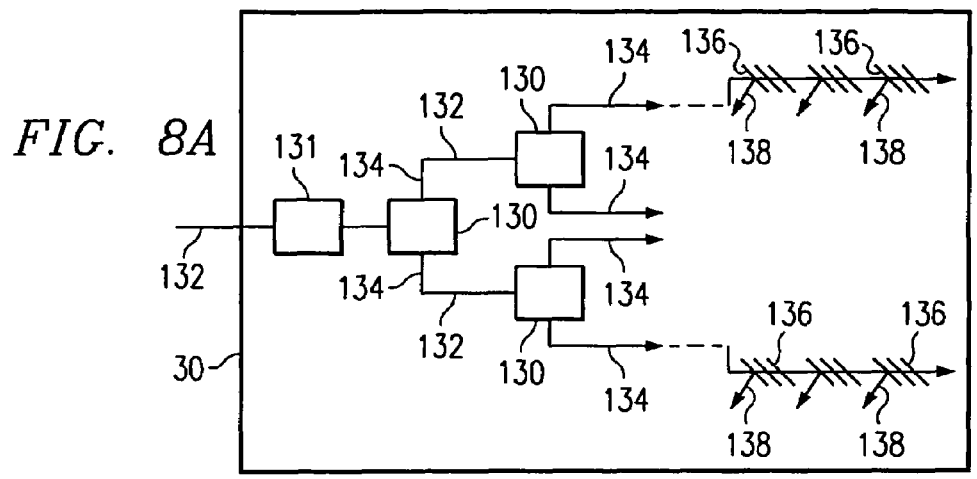
FIGS. 8A–C are block diagrams illustrating the demultiplexer of FIG. 1 in accordance with several embodiments of the present invention.
Figure 8B:
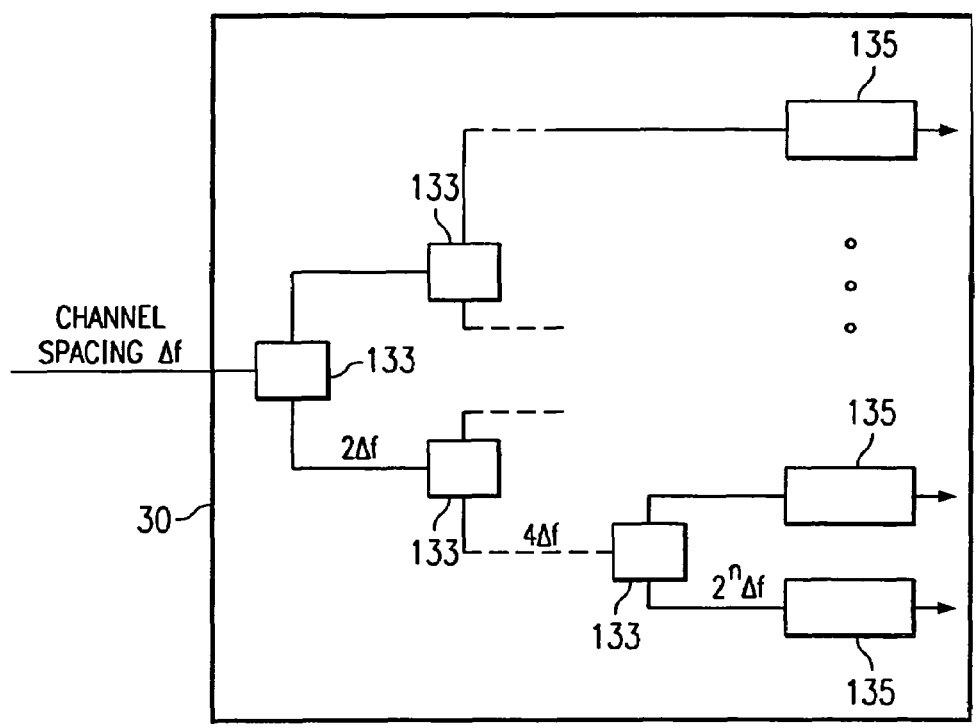
Figure 8C:
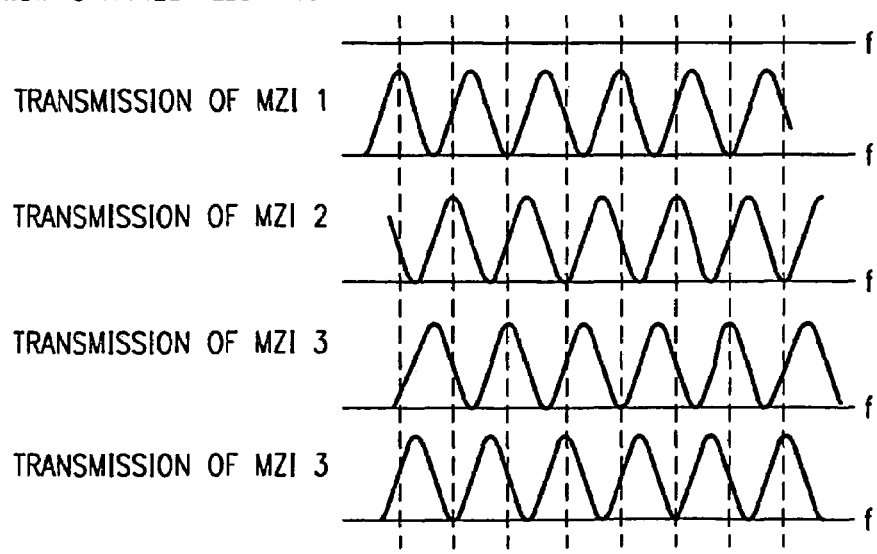

FIGS. 8A–C illustrate details of the demultiplexer 30 in accordance with one embodiment of the present invention. In this embodiment, phase or frequency modulated optical information signals 24 are converted to intensity modulate optical information signals within the demultiplexer 30 of the WDM receiver 14 and/or before demultiplexing or between demultiplexing steps. It will be understood that the demultiplexer 30 may otherwise suitably demultiplex and/or separate the optical information signals 24 from the WDM signal 26 without departing from the scope of the present invention.

Referring to FIG. 8A, the demultiplexer 30 comprises a plurality of demultiplex elements 130 and a multi-channel format converter 131. Each demultiplex element 130 separates a received set of channels 132 into two discrete sets of channels 134. Final channel separation is performed by dielectric filters 136 which each filter a specific channel wavelength 138.

The multichannel format converter 131 converts phase modulation to intensity modulation and may be an asymmetric Mach-Zender interferometer with a one-bit shift to convert non-intensity modulated signals to intensity modulated signals as previously described in connection with interferometer 100 or suitable optical device having a periodical optical frequency response that converts at least two phase or frequency modulated channels into intensity modulated WDM signal channels. The intensity-conversion interferometer may be prior to the first stage demultiplex element 130, between the first and second stages or between other suitable stages. The other demultiplex elements 130 may comprise filters or non-conversion Mach-Zender interferometers operable to filter the incoming set of channels 132 into the two sets of output channels 134.

In a particular embodiment, the multichannel format converter 131 is an asymmetric Mach-Zender interferometer with a free spectral range coinciding with the WDM channel spacing or its integer sub-multiple. This allows all the WDM channels to be converted within the Mach-Zender interferometer simultaneously. In this embodiment, a channel spacing may be configured based on the channel bit rate which defines the free spectral range. Placement of the intensity-conversion Mach-Zender interferometer in the demultiplexer 30 eliminates the need for the interferometer 100 at each optical receiver 32 which can be bulky and expensive. In addition, the demultiplexer 30 including the Mach-Zender and other demultiplexer elements 130 may be fabricated on a same chip which reduces the size and cost of the WDM receiver 14.

Referring to FIG. 8B, the demultiplexer 30 comprises a plurality of wavelength interleavers 133 and a multichannel format converter 135 for each set of interleaved optical information signals output by the last stage wavelength interleavers 133. Each wavelength interleaver 133 separates a received set of channels into two discrete sets of interleaved channels. The multichannel format converters 135 may be asymmetric Mach-Zender interferometers with a one-bit shift to convert non-intensity modulated signals to intensity modulated signals as previously described in connection with interferometer 100 or other suitable optical device. Use of the wavelength interleavers as part of the WDM demultiplexing in front of the format converters allow several WDM channels to be converted simultaneously in one Mach-Zender interferometer even if the free spectral range of the interferometer does not coincide with an integer multiple of the WDM channel spacing. FIG. 8C illustrates transmissions of four Mach-Zender interferometers for a particular embodiment of the demultiplexer 30 using wavelength interleavers 133 in which the free spectral range is three quarters of the channel spacing. In this embodiment, the four Mach-Zender interferometers may be used to convert all of the WDM channels.

Figure 9:
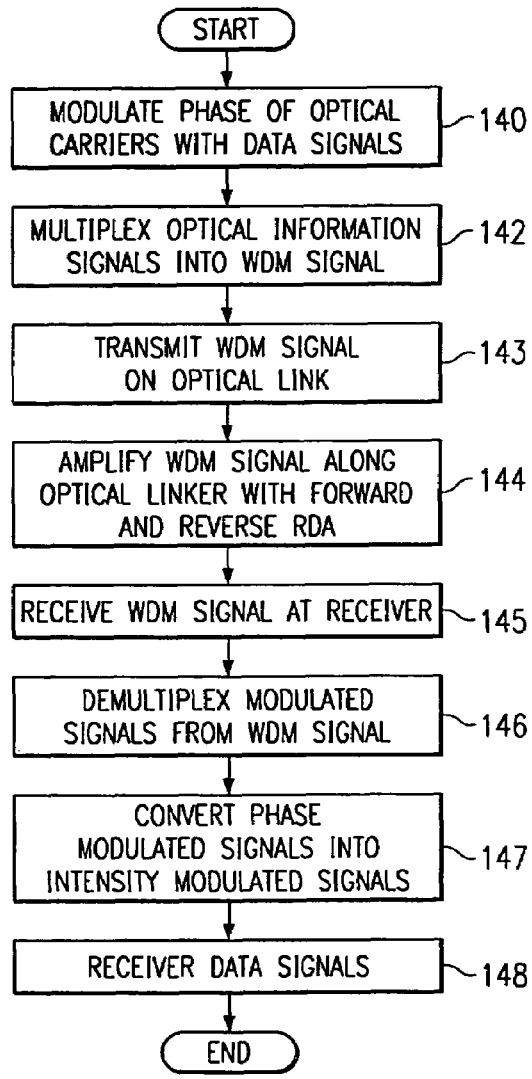
FIG. 9 is a flow diagram illustrating a method for communicating data over an optical communication system using distributed amplification in accordance with one embodiment of the present invention.

FIG. 9 illustrates a method for transmitting information in an optical communication system using distributed amplification in accordance with one embodiment of the present invention. In this embodiment, data signals are phase-shift keyed onto the carrier signal and the signal is amplified during transmission using discrete and distributed amplification.

Referring to FIG. 9, the method begins at step 140 in which the phase of each disparate wavelength optical carrier signal is modulated with a data signal 74 to generate the optical information signals 24. At step 142, the optical information signals 24 are multiplexed into the WDM signal 26. At step 143, the WDM signal 26 is transmitted in the optical link 16.

Proceeding to step 144, the WDM signal 26 is amplified along the optical link 16 utilizing discrete and distributed amplification. As previously described, the WDM signal 26 may amplified at discrete points using EDFAs 42 and distributively amplified using bi-directional DRAs 44. Because the data signals are modulated onto the phase of the carrier signal, cross talk between channels from XGM due to forward pumping amplification is eliminated. Accordingly, the signal-to-noise ratio can be maximized and the signals may be transmitted over longer distances without regeneration.

Next, at step 145, the WDM signal 26 is received by the WDM receiver 14. At step 146, the WDM signal 26 is demultiplexed by the demultiplexer 30 to separate out the optical information signals 24. At step 147, the phase modulated optical information signals 24 are converted to intensity modulated signals for recovery of the data signal 74 at step 148. In this way, data signals 74 are transmitted over long distances using forward or bi-directional pumping distributed amplification with a low bit-to-noise ratio.

Figure 10:
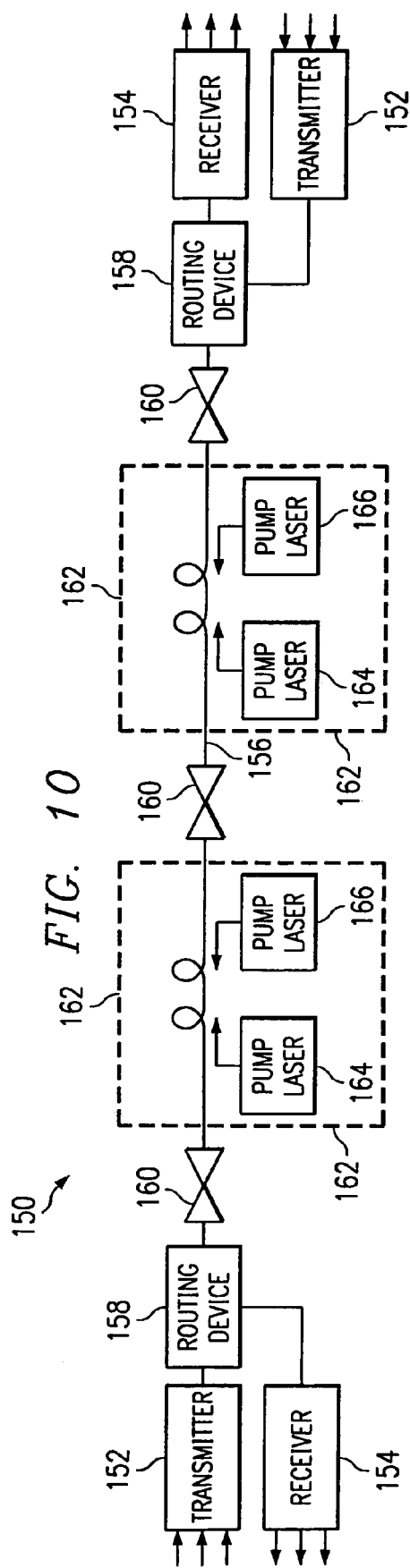
FIG. 10 is a block diagram illustrating a bi-directional optical communication system using distributed amplification in accordance with one embodiment of the present invention.

FIG. 10 illustrates a bi-directional optical communication system 150 in accordance with one embodiment of the present invention. In this embodiment, the bi-directional communication system 150 includes WDM transmitters 152 and WDM receivers 154 at each end of an optical link 156. The WDM transmitters 152 comprise optical senders and a multiplexer as previously described in connection with the WDM transmitter 12. Similarly, the WDM receivers 154 comprise demultiplexers and optical receivers as previously described in connection with the WDM receiver 14.

At each end point, the WDM transmitter and receiver set is connected to the optical link 156 by a routing device 158. The routing device 158 may be an optical circulator, optical filter, or optical interleaver filter capable of allowing egress traffic to pass onto the link 156 from WDM transmitter 152 and to route ingress traffic from the link 156 to WDM receiver 154.

The optical link 156 comprises bi-directional discrete amplifiers 160 and bi-directional distributed amplifiers 162 spaced periodically along the link. The bi-directional discrete amplifiers 160 may comprise EDFA amplifiers as previously described in connection with amplifiers 42. Similarly, the distributed amplifiers 162 may comprise DRA amplifiers including co-pumping and counter-pumping lasers 164 and 166 as previously described in connection with DRA amplifiers 44.

In operation, a WDM signal is generated and transmitted from each end point to the other end point and a WDM signal is received from the other end point. Along the length of the optical link 156, the WDM signals are amplified using bi-directional-pumped DRA 162. Because data is not carried in the form of optical intensity, cross talk due to XGM is eliminated. Thus, DRA and other suitable distributed amplification may be used in long-haul and other suitable bi-directional optical transmission systems.

Figure 11:
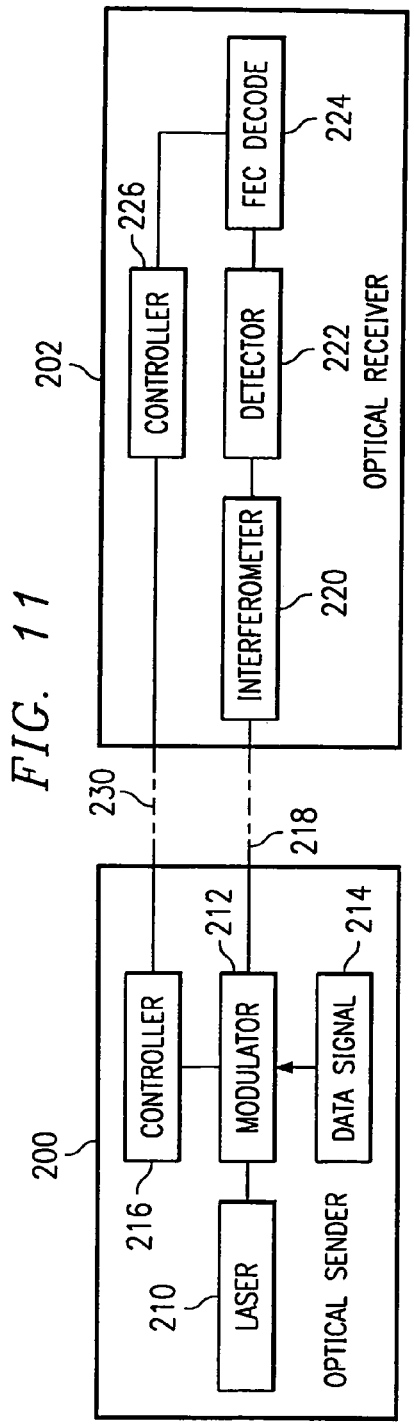
FIG. 11 is a block diagram illustrating the optical sender and receiver of FIG. 1 in accordance with another embodiment of the present invention.

FIG. 11 illustrates an optical sender 200 and an optical receiver 202 in accordance with another embodiment of the present invention. In this embodiment, the optical sender 200 and the optical receiver 204 communicate to fine-tune modulation for improved transmission performance of the optical information signals 24. It will be understood that modulation of the optical information signals 24 may be otherwise fine-tuned using downstream feedback without departing from the scope of the present invention.

Referring to FIG. 11, the optical sender 200 comprises a laser 210, a modulator 212, and a data signal 214 which operate as previously described in connection with the laser 70, the modulator 72 and the data signal 74. A controller 216 receives bit error rate or other indication of transmission errors from the downstream optical receiver 202 and adjust the modulation depth of modulator 212 based on the indication to reduce and/or minimize transmission errors. The controller 216 may adjust the amplitude, intensity, phase, frequency and/or other suitable modulation depth of modulator 212 and may use any suitable control loop or other algorithm that adjusts modulation alone or in connection with other characteristics toward a minimized or reduced transmission error rate. Thus, for example, the controller 216 may adjust a non-intensity modulation depth and a depth of the periodic intensity modulation in the optical sender 80 to generate and optimize multimodulated signals.

The optical receiver 202 comprises an interferometer 220 and a detector 222 which operate as previously described in connection with interferometer 100 and detector 102. A forward error correction (FEC) decoder 224 uses header, redundant, symptom or other suitable bits in the header or other section of a SONET or other frame or other transmission protocol data to determine bit errors. The FEC decoder 224 corrects for detected bit errors and forwards the bit error rate or other indicator of transmission errors to a controller 226 for the optical receiver 202.

The controller 226 communicates the bit error rate or other indicator to the controller 216 in the optical sender 200 over an optical supervisory channel (OSC) 230. The controllers 216 and 226 may communicate with each other to fine-tune modulation depth during initiation or setup of the transmission system, periodically during operation of the transmission system, continuously during operation of the transmission system or in response to predefined trigger events. In this way, modulation depth is adjusted based on received signal quality measured at the receiver to minimize chromatic dispersion, non-linear effects, receiver characteristics and other unpredictable and/or predictable characteristics of the system.

Figure 12:
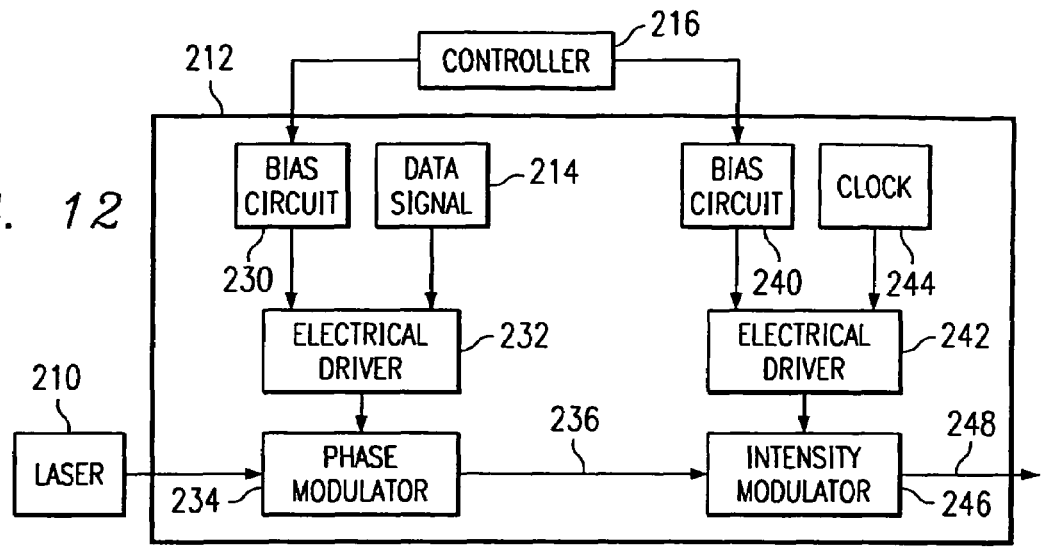
FIG. 12 is a block diagram illustrating the modulator of FIG. 11 in accordance with one embodiment of the present invention.

FIG. 12 illustrates details of the modulator 212 in accordance with one embodiment of the present invention. In this embodiment, the modulator 212 employs phase and intensity modulation to generate a bi-modulated optical information signal. The phase and intensity modulation depth is adjusted based on receiver-side feedback to minimize transmission errors.

Referring to FIG. 12, the modulator 212 includes for phase modulation such as phase shift keying a bias circuit 230 coupled to an electrical driver 232. The bias circuit 230 may be a power supply and the electrical driver 232 a broadband amplifier. The bias circuit 230 is controlled by the controller 216 to output a bias signal to the electrical driver 232. The bias signal provides an index for phase modulation. The electrical driver 232 amplifies the data signal 214 based on the bias signal and outputs the resulting signal to phase modulator 234. Phase modulator 234 modulates the receive bias-adjusted data signal onto the phase of the carrier signal output by the laser 210 to generate a phase modulated optical information signal 236.

For intensity modulation such as intensity shift keying, the modulator 212 includes a bias circuit 240 coupled to an electrical driver 242. The bias circuit 240 is controlled by the controller 216 to output a bias signal to the electrical driver 242. The bias signal acts as an intensity modulation index. The electrical driver 242 amplifies a network, system or other suitable clock signal 244 based on the bias signal and outputs the resulting signal to the intensity modulator 246. The intensity modulator 246 is coupled to the phase modulator 234 and modulates the receive bias-adjusted clock signal onto the phase modulated optical information signal 236 to generate the bi-modulated optical information signal for transmission to a receiver. It will be understood that phase and intensity modulation at the transmitter may be otherwise suitably controlled based on receiver-side feedback to minimize transmission errors of data over the optical link.

Figure 13:
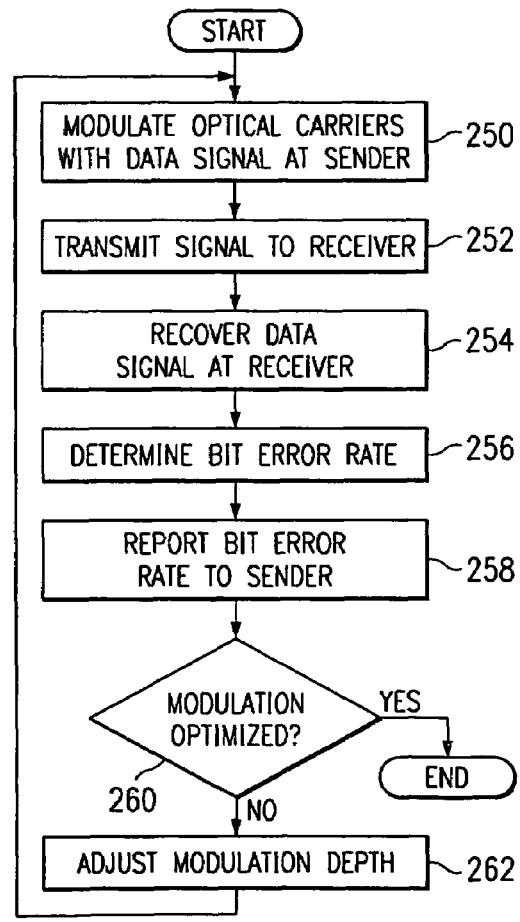
FIG. 13 is a flow diagram illustrating a method for tuning the modulation depth of an optical signal based on receiver side information in accordance with one embodiment of the present invention.

FIG. 13 illustrates a method for fine tuning modulation depth of an optical information signal using receiver side information in accordance with one embodiment of the present invention. The method begins at step 250 in which an optical carrier is modulated with a data signal 214 at the optical sender 200. Next, at step 252, the resulting optical information signal 24 is transmitted to the optical receiver 202 in a WDM signal 26.

Proceeding to step 254, the data signal 214 is recovered at the optical receiver 204. At step 256, the FEC decoder 224 determines a bit error rate for the data based on bits in the SONET overhead. At step 258, the bit error rate is reported by the controller 226 of the optical receiver 202 to the controller 216 of the optical sender 200 over the OSC 230.

Next, at decisional step 260, the controller 216 determines whether modulation is optimized. In one embodiment, modulation is optimized when the bit error rate is minimized. If the modulation is not optimized, the No branch of decisional step 260 leads to step 262 in which the modulation depth is adjusted. Step 262 returns to step 250 in which the data signal 214 is modulated with the new modulation depth and transmitted to the optical receiver 202. After the modulation depth is optimized from repetitive trails and measurements or other suitable mechanisms, the Yes branch of decisional step 260 leads to the end of the process. In this way, transmission performance is improved and transmission errors minimized.

Figure 14:
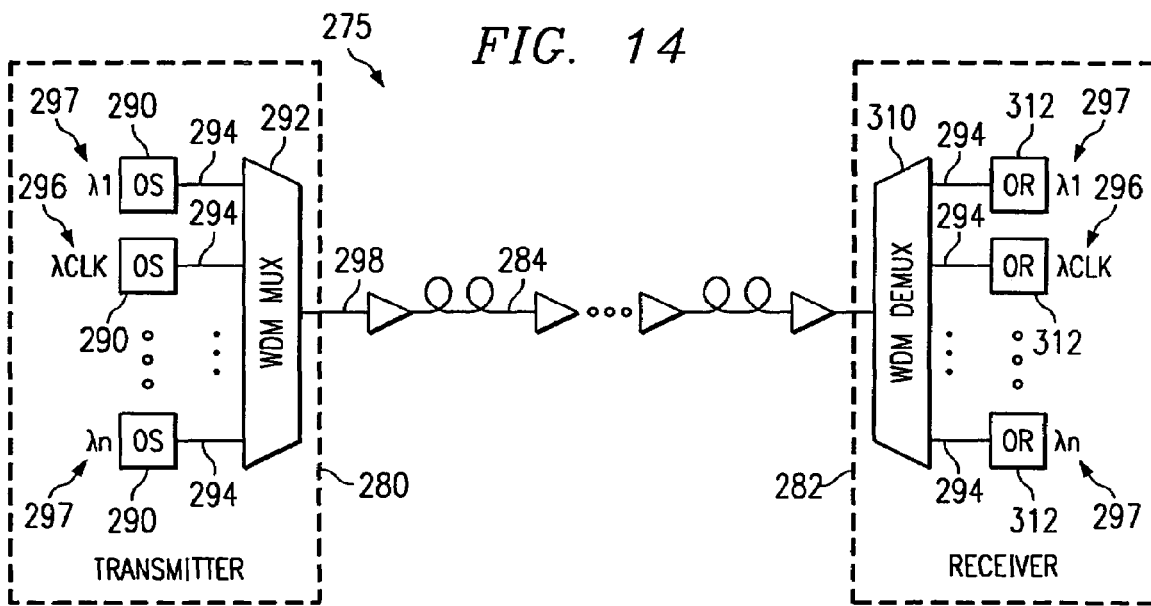
FIG. 14 is a block diagram illustrating an optical communication system distributing a clock signal in an information channel in accordance with one embodiment of the present invention.

FIG. 14 illustrates an optical communication system 275 distributing a clock signal in an information channel in accordance with one embodiment of the present invention.

In this embodiment, pure clock is transmitted in channels to one, more or all nodes in the optical system 275.

Referring to FIG. 14, optical system 275 includes a WDM transmitter 280 coupled to a WDM receiver 282 over an optical link 284. The WDM transmitter 280 includes a plurality of optical senders 290 and a WDM multiplexer 292. Each optical sender 290 generates an optical information signal 294 on one of a set of discrete wavelengths at the channel spacing. In the clock channel 296, the optical sender 290 generates an optical information signal 294 with at least one characteristic modulated to encode the clock signal. In the data channels 297, the optical sender 290 generates an optical information signal 294 with at least one characteristic modulated to encode a corresponding data signal.

The optical signals 294 from the clock and data channels 296 and 297 are multiplexed into a signal WDM signal 298 by the WDM multiplexer 292 for transmission on the optical link 284. Along the optical link 284, the signal may be amplified by discrete and/or distributed amplifiers as previously described.

The WDM receiver 282 receives, separates and decodes the optical information signals 294 to recover the included data and clock signals. In one embodiment, the WDM receiver 282 includes a WDM demultiplexer 310 and a plurality of optical receivers 312. The WDM demultiplexer 310 demultiplexes the optical information signals 294 from the single WDM signal 298 and sends each optical information signal 294 to a corresponding optical receiver 312.

Each optical receiver 312 optically or electrically recovers the encoded data or clock signal from the corresponding signal 294. In the clock channel 296, the clock signal is recovered and forwarded to the optical receivers 312 in the data channels 297 for use in data extraction and forward error correction. The transmission of pure clock in an information channel allows a more stable clock recovery with less jitter. The stable clock may be used by forward error correction to improve the bit error rate even in the presence of jitter and poor optical signal quality.

Figure 15:
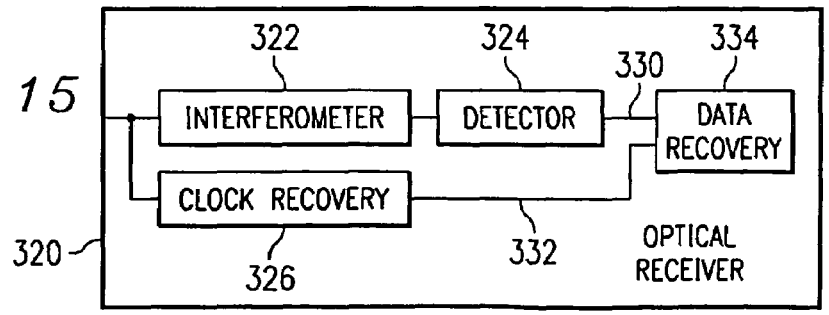
FIG. 15 is a block diagram illustrating an optical receiver for extracting a clock signal from a multimodulated signal in accordance with one embodiment of the present invention.

FIG. 15 illustrates an optical receiver 320 for extracting a clock signal from a multimodulated signal in accordance with one embodiment of the present invention. In this embodiment, the optical receiver 320 receives a demultiplexed optical information signal with data phase modulated onto a carrier signal that is then remodulated with intensity modulation synchronized with the network, system or other suitable clock as described in connection with the optical sender 80. The optical receiver 320 extracts the clock information from the optical signal and uses the stable clock to recover data from the phase modulated signal of the channel. Thus, each channel can recover its own clock.

Referring to FIG. 15, the optical receiver 320 includes an interferometer 322 and a detector 324 as previously described in connection with the optical receiver 32. The interferometer 322 receives the miltimodulated signal and converts the phase modulation into intensity modulation for recovery of the data signal 330 by the detector 324.

A clock recovery element 326 comprises a photodiode and/or other suitable components to recover the clock signal before phase-to-intensity conversion of the data signal. The clock recovery element 326 may comprise a phase lock loop, a tank circuit, a high quality filter and the like. The clock recovery element 326 receives the multimodulated signal and recovers the clock signal 332 from the intensity modulation.

The data signal 330 and the recovered clock signal 332 are output to a digital flip flop or other suitable data recovery circuit 334. In this way, the optical receiver 320 extracts the clock information from the optical signal before the phase-to-intensity conversion of the data signal and provides a stable clock recovery with less jitter even with poor optical signal quality corresponding to a bit error rate in the range of $1e^{-2}$.

Although the present invention has been described with several embodiments, various changes and modifications may be suggested to one skilled in the art. It is intended that the present invention encompass such changes and modifications as fall within the scope of the appended claims.

What is claimed is:

1. A method for communicating a clock signal over an optical link, comprising:
   receiving a multimodulated optical information signal comprising non-intensity modulation for a data signal and intensity modulation for a clock signal;
   recovering the clock signal based on the intensity modulation for the clock signal;
   converting the non-intensity modulation for the data signal to intensity modulation for the data signal; and
   recovering the data signal from the intensity modulation for the data signal using the clock signal.

2. The method of claim 1, wherein the non-intensity modulation comprises a phase modulation of a carrier signal.

3. The method of claim 1, wherein the non-intensity modulation comprises a frequency modulation of a carrier signal.

4. The method of claim 1, wherein the data signal is phase shift keyed in the multimodulated optical information signal and the clock signal is intensity shift keyed in the multimodulated optical information signal.

5. The method of claim 1, wherein converting the non-intensity modulation for the data signal to intensity modulation for the data signal comprises converting the non-intensity modulation for the data signal to intensity modulation for the data signal after recovering the clock signal.

6. A system for communicating a clock signal over an optical link, comprising:
   means for receiving a multimodulated optical information signal comprising non-intensity modulation for a data signal and intensity modulation for a clock signal;
   means for recovering the clock signal based on the intensity modulation for the clock signal;
   means for converting the non-intensity modulation for the data signal to intensity modulation for the data signal; and
   means for recovering the data signal from the intensity modulation for the data signal using the clock signal.

7. The system of claim 6, wherein the non-intensity modulation comprises a phase modulation of a carrier signal.

8. The system of claim 6, wherein the non-intensity modulation comprises a frequency modulation of a carrier signal.

9. The system of claim 6, wherein the data signal is phase shift keyed in the multimodulated optical information signal and the clock signal is intensity shift keyed in the multimodulated optical information signal.

10. The system of claim 6, wherein means for converting the non-intensity modulation for the data signal to intensity modulation for the data signal comprises means for converting the non-intensity modulation for the data signal to intensity modulation for the data signal after recovering the clock signal.

11. A optical receiver, comprising:
an interface for receiving a multimodulated optical information signal comprising non-intensity modulation for a data signal and intensity modulation for a clock signal;
a clock recovery element operable to recover the clock signal based on the intensity modulation for the clock signal; and
a data recovery element operable to recover the data signal from the non-intensity modulation of the multimodulated optical information signal based on the clock signal.

12. The receiver of claim 11, wherein the non-intensity modulation comprises a phase modulation of a carrier signal.

13. The receiver of claim 11, wherein the non-intensity modulation comprises a frequency modulation of a carrier signal.

14. The receiver of claim 11, wherein the data signal is phase shift keyed in the multimodulated optical information signal and the clock signal is intensity shift keyed in the multimodulated optical information signal.

15. The receiver of claim 11, wherein the multimodulated optical information signal is provided to the clock recovery element at a point prior to the data recovery element.

16. A method for communicating a clock signal over an optical link, comprising:
receiving a multimodulated optical information signal comprising non-intensity modulation for a data signal and intensity modulation for a clock signal;
recovering the clock signal based on the intensity modulation for the clock signal;
converting the non-intensity modulation for the data signal to intensity modulation for the data signal after recovering the clock signal; and
recovering the data signal from the intensity modulation for the data signal using the clock signal.

17. The method of claim 16, wherein the non-intensity modulation comprises a phase modulation of a carrier signal.

18. The method of claim 16, wherein the non-intensity modulation comprises a frequency modulation of a carrier signal.

19. The method of claim 16, wherein the data signal is phase shift keyed in the multimodulated optical information signal and the clock signal is intensity shift keyed in the multimodulated optical information signal.

* * * * *